United States Patent
Wren

(10) Patent No.: US 7,379,900 B1
(45) Date of Patent: May 27, 2008

(54) SYSTEM FOR MARKETING GOODS AND SERVICES UTILIZING COMPUTERIZED CENTRAL AND REMOTE FACILITIES

(75) Inventor: Stephen Corey Wren, Hazelwood, MO (US)

(73) Assignee: Variant Holdings LLC, Nevis ( * ) Notice: Subject to any disclaimer, the term of this patent is extended or adjusted under 35 U.S.C. 154(b) by 1216 days.

(21) Appl. No.: 09/504,374

(22) Filed: Feb. 15, 2000

Related U.S. Application Data

(60) Division of application No. 08/668,561, filed on Jun. 21, 1996, now Pat. No. 6,055,514, which is a continuation-in-part of application No. 08/268,309, filed on Jun. 29, 1994, now abandoned, which is a continuation-in-part of application No. 08/264,184, filed on Jun. 22, 1994, now abandoned, which is a continuation of application No. 08/051,743, filed on Apr. 22, 1993, now abandoned, and a continuation-in-part of application No. 07/855,099, filed on Mar. 20, 1992, now abandoned.

(51) Int. Cl.
*G06Q 30/00* (2006.01)
(52) U.S. Cl. .......................................... 705/26; 705/37
(58) Field of Classification Search .................. 705/27, 705/26; 709/202
See application file for complete search history.

(56) References Cited

U.S. PATENT DOCUMENTS

| | | | | |
|---|---|---|---|---|
| 4,799,156 A | * | 1/1989 | Shavit et al. ................ 364/401 |
| 4,992,940 A | * | 2/1991 | Dworkin ...................... 705/26 |
| 5,231,571 A | * | 7/1993 | D'Agostino ................. 705/26 |
| 5,347,632 A | * | 9/1994 | Filepp et al. ............... 395/200 |
| 5,451,998 A | * | 9/1995 | Hamrick ...................... 348/13 |
| 5,787,403 A | | 7/1998 | Randle |
| 5,794,207 A | * | 8/1998 | Walker et al. ................. 705/1 |
| 5,794,217 A | * | 8/1998 | Allen ........................... 705/27 |
| 5,845,265 A | * | 12/1998 | Woolston ..................... 705/37 |
| 5,899,982 A | * | 5/1999 | Randle ........................ 705/35 |
| 6,055,514 A | * | 4/2000 | Wren ........................... 705/27 |
| 6,269,343 B1 | * | 7/2001 | Pallakoff ..................... 705/26 |

OTHER PUBLICATIONS

"Retailers Turn To Kiosks;" Chain Store Age Executive; v68n4, pp. 42-43; Apr. 1992.*

Charles Smith, Auctions—the construction of social values, University of California Press, 1989, pp. 2-3, 64-65, 164-165, 168-172.*

(Continued)

*Primary Examiner*—James Zurita

(57) ABSTRACT

A system for shopping for goods and services includes central communications facilities and remote communications facilities connected by communications links and means permitting data communications between them. Central communications facilities offer goods and services in competition with each other. Each central communications facility stores, in addition to data, graphics in the form of video, and audio in the form of computerized voice and music. Computer input devices at each remote communications facility permit customers to access the data, graphics and audio. Computers at each remote communications facility also enable that facility to receive and download the data, graphics, and audio. Each remote communications facility is adapted to enable a customer, after viewing the data, graphics, and audio, to electronically negotiate a price for the purchase of the goods and services. Each central communications facility can generate and transmit to the remote facility transaction specific paperwork relative to the price so negotiated.

5 Claims, 1 Drawing Sheet

OTHER PUBLICATIONS

John Viescas, Official Guide to the Prodigy Service, Microsoft Press, 1991, ISBN 1-55615-374-0, Ch. 6, pp. 210, 217, 220 and 227, 7 pages.*

Unknown author, Prodigy Services Add Offerings, Wall Street Journal (Eastern edition), New York, N.Y., Mar. 18, 1991, Proquest ID 27808985. The article was accessed from the Internet on Oct. 20, 2003/Offerings, 1 page.*

Williams, Bob, Blanc, Maureen, Horn, Sabrina, Perkins, Alyce entitled Verity Announces TOPIC Real-Time and Strategic Alliance With Dow Jones & Co., Business Wire. New York: Apr. 23, 1990. Sec. 1. p. 1, ProQuest ID: 6395601/Verity, 3 pages.*

Don Oldenburg, Making the Right Connection, The Washington Post (pre-1997 Fulltext). Washington, D.C.: Jan. 29, 1992. p. b.05/Right Connection, 3 pages.*

Bob Bruce, entitled Home-Based Banking Slowly Catching, Boulder County Business Report, Boulder, CO, Oct. 1989; vol. 8;Iss. 9; Sec. 1, p. 6; ProQuest ID: 7285253/Home-Based Banking, 4 pages.*

Anonymous author, New Competitor for Prodigy, Catalog Age, New Canaan: Aug. 1991. vol. 8, Iss. 8; p. 38, accessed via Proquest on Oct. 20, 2003/New Competitor for Prodigy, 1 page.*

Michael Pollick, Online Services Get On track, The Sun, Baltimore, Aug. 11, 1991, p. 1/Online Services, 3 pages.*

Michael Banks, How to Determine Which Personal Online Service is Rignt For You, Medford: Mar./Arp. 1993. vol. 10, Iss. 2; p. 20, 5 pgs, ProQuest ID:98658/Right For You, 5 pages.*

Software Publishing Corp. Unveils New Support Warranty Policy, by Len Filppu, Business Wire, New York, Aug. 26, 1993/Support Policy, 3 pages.*

Karen M. Cheseby, Kenneth T. Berents, Paul T. Sweeney, What the Analysts Say, The Washington Post, Washington, D.C.: Aug. 23, 1993. p. F.33. ProQuest ID: 72181259/PricingStrategy, 3 pages.*

Author unknown, Services: AT&T Provides Compass, Communications International., London, Jul. 1993, vol. 20, issue 7, 2 pages.*

* cited by examiner

SYSTEM FOR MARKETING GOODS AND SERVICES UTILIZING COMPUTERIZED CENTRAL AND REMOTE FACILITIES

CROSS REFERENCE TO RELATED APPLICATIONS

This application is a division of U.S. application Ser. No. 08/668,561, filed Jun. 21, 1996 now U.S. Pat. No. 6,055,514, now allowed, which is a continuation-in-part of application Ser. No. 08/268,309, filed Jun. 29, 1994 now abandoned, which is a continuation-in-part of application Se. No. 08/264,184, filed Jun. 22, 1994 now abandoned, which in turn was a continuation of application Ser. No. 08/051,743, filed Apr. 22, 1993 now abandoned, application Ser. No. 08/051,743 was itself a continuation-in-part of Ser. No. 07/855,099, filed Mar. 20, 1992 now abandoned, all of which are incorporated herein by reference. The application herein is copending with Ser. No. 08/650,834, filed May 20, 1996 which is also a continuation-in-part of copending U.S. application Ser. No. 08/268,309, filed Jun. 29, 1994. Applicant incorporates herein by reference application Ser. No. 08/650,834 in its entirety.

FIELD OF THE INVENTION

The present invention generally relates to a system and means for establishing a communicating link between remote facilities. More particularly, the invention is concerned with a system and means for facilitating transactions between central and remote facilities utilizing electronic communications devices and computing equipment for concurrently or nonconcurrently transmitting voice, music, audio, data, images, video, and optic information on goods and services, and/or signals. Such systems will be used to market, sell, finance, and insure goods and/or services.

DESCRIPTION OF THE PRIOR ART

Over the years the marketing of certain financial services and in general of all goods and services to retail customers, such as auto financing to car purchasers at car dealerships, has increasingly been hindered by problems experienced by the companies providing the financial services. In fact these difficulties extend to all providers of goods and services in reaching their customers. The more serious of these problems are high administrative costs, long delays in creating and implementing new financial service products, and complex methods which confound and confuse retail sales locations and their customers.

The traditional approach in marketing financial service products has been to offer them at retail sales locations by employees of the retail businesses acting as agents of the financial services companies. One of the consequences of this traditional approach is that each retail sales business is required to have the necessary means for calculating or computing and quoting rather complicated matters, such as payments and premiums, and to be responsible for maintaining computer hardware and software systems independently of and in addition to that at the financial service companies. All too frequently these requirements result in contracts written with wrong amounts and/or terms which later create embarrassment and confusion for the retail sales business when those contracts have to be amended, endorsed, or worse yet completely rejected.

Another consequence of this traditional approach is that in acting as agents of the financial services companies, the employees of the retail sales businesses are often required to be licensed in their state to do so. High turnover rate of these employees can pose a serious problem for these businesses as personnel with such skills are not easy to find. Furthermore, there are considerable costs for the retail sales businesses in maintaining separately these in-house systems or replacing them to keep pace with changing products and regulations.

An ideal system for providing these financial services is one which overcomes the above-described problems of the traditional approach. Such ideal system will employ the qualified agents or representatives available at the financial services company and its centrally located computer hardware, software, and product information and thereby eliminate the necessity for employees of the local retail sales business to qualify to act as agents of the financial services company. Elimination of local agents will reduce the incidence of contracts containing errors and save the cost of training such employees. Also, such ideal system will utilize the hardware and software existing at the central financial services company comprising all desirable product information and thereby eliminate the necessity to purchase and maintain at each remote location the hardware and software necessary to process and support the activities of such otherwise remotely located employee agents. Further, such ideal system will employ the expertise of agents at the financial services company and generate the appropriate financial services documents tailored to the particular customer and thereby eliminate the necessity to obtain and maintain the instructional manuals and application forms necessary for carrying out of these activities at each remote location.

The prior patent art reveals two remote transaction systems whose stated objective is to reduce overhead expenses. These remote transaction systems should be considered as possible candidates for offering solutions to the aforementioned problems experienced with the traditional approach of providing financial services.

One such system disclosed in U.S. Pat. No. 5,231,571 to D'Agostino provides a method of offering financial service products to customers at remote locations by way of representatives at a central location. Accordingly product information is displayed at the customer's terminal as the customer and representative converse.

However, the D'Agostino method requires that the information to be displayed the customer be stored in the computer at the remote facility unlike the preferred embodiment of the present invention where the information is centralized or stored centrally and thereafter transmitted to the customer at the remote location, making it difficult to correct or modify the information thus shown to customers. Also in storing the information to be displayed to each customer remotely each representative will be required to be licensed to sell such products in each state he might assist a customer and therefore significantly increase the number of required representatives otherwise necessary. In this manner the preferred embodiment of the present invention where such information about goods and services is stored at the central facility can reduce the licensing requirements of the representatives and thus the number of representatives required.

Further D'Agostino relies upon static or still motion images of the representative as displayed to the customer and stored remotely causing a constant need for changes of that information created by turnover of representative staff, unlike the present invention which can store such information centrally or as in another embodiment permit 2way full motion color video images or video conferencing thus eliminating the need of storing any such image, remotely or centrally. In relying upon still motion images of his representatives he has most of all greatly limited the effectiveness of his system as a selling tool as recently 2way full motion video has been proven to greatly and unexpectedly increase product sales offered through such systems or methods such as described in the March 1993 issue of The Banker on page 61. Nor has his method provided the customer an input means thereby chaining the customer to the representative thus giving him no freedom in reviewing product information on his own without the help of the representative as the customer can with the present invention. He has to the contrary demonstrably taught against the use of the keyboard as a means of input by the customer at the remote facility and has not provided for any further means of customer input.

Also in not permitting the storing of product information other than remotely he has created a captive situation for remote users permitting them to only use the goods and services of a single provider whereas the present invention will with central storage permit each remote facility or location to communicate with an array of central facilities, sort of a public telephone. Thus at best, the D'Agostino method leads to less than an optimum solution to the problems noted heretofore with the traditional approach to marketing financial service products and all other goods and services.

Previous art in the field limited use of a given customer facility to a single provider. In the present invention it is contemplated that customers can use the remote facility devices to contact multiple providers of goods and services. There are 2 advantages to this aspect. The first is that in permitting remote locations to communicate with multiple central facilities, providers are able to share the costs of the remote facility equipment. Previously the cost of the equipment at the remote location was prohibitive so that the system's use was impractical for all but a few select applications.

The second advantage is the greater number and selection of goods and services available to customers. Since providers will be able to share the cost of the remote equipment more providers will be encouraged to participate and an even greater variety of products will be offered. The difference between the present invention and the prior art therefore is comparable to a grocery store with only one brand of soft drink as opposed to an aisle with an assortment of beverages. The reduction of expense for each provider will thereby encourage providers to use these systems as a low cost means of providing for the marketing and sales of their products to the public. These savings can in turn be passed along to their customers. Multiple companies can then share the expense of the equipment at the remote location. This method also as above improves the competition for the products offered at the remote location, breaking the monopolistic model of the previous art.

Another remote transaction system disclosed in U.S. Pat. No. 4,845,636 to Walker provides a transaction booth located remotely from an operations center for facilitating a transaction such as the renting of an automobile. The booth and center were connected by audio and video equipment used for transmitting audio and video signals from the customer in the booth to the agent at the operations center in order to negotiate a transaction. The customer in this instance knew what he wanted. He was not shopping, but merely seeking to effect a predetermined transaction.

However, the Walker remote transaction system has no means for producing a financial services document or contract at the booth tailored to the specific needs of the customer, nor does it utilize 2way full motion video thereby severely limiting its applications and efficacy by not providing the remote user full motion images such as of the agent or of what might be described as full motion commercials. The present invention furthermore represents a new use as Walker did not anticipate the sale of financing and insurance by any such system nor could he have used his for such. Walker as well fails to provide the user at the remote facility a means of input and as a result as with D'Agostino chains the customer to the representative.

Neither does Walker permit each remote facility to communicate with a variety of central facilities thus restricting the variety and competition for goods and services there offered and has therefor himself created a monopoly. Thus at best, the Walker system leads to less than an optimum solution to the problems noted heretofore with the traditional approach to marketing financial service products.

Consequently, a need still exists for new and improved systems which facilitate consummation of business transactions utilizing central and remote facilities or locations.

OBJECTS OF THE INVENTION

An object of this invention is to provide a system and method for facilitating transactions utilizing central and remote facilities or locations which satisfies the aforementioned needs.

Another object of the invention is to facilitate transactions by customers at remote locations, for instance, car, truck, boat and motorcycle dealerships, department stores, public locations such as shopping malls, auction houses, airports, grocery stores, and real estate offices.

Another object of the present invention is to further centralize and simplify the responsibilities over these products.

A further object of the present invention is to shorten the time required to create and implement new products in the financial services arena and all others.

An additional object is to provide a wider variety of products to offer customers.

SUMMARY OF THE INVENTION

The system for marketing goods and services herein includes a customer computerized communications facility, a central computerized communications facility remote therefrom, and a data link between them. This invention is an improvement in that system which includes:

computer means at both the customer computerized communications facility and the central computerized communications facility, adapted to transmit and receive images and data between them; means for additionally establishing voice contact between the two communications facilities; software stored at the central computerized communications facility adapted to provide goods and services information; input means at the customer computerized communications facility adapted to enable a type of customer who is uneasy using a computer to access that software in order to view a presentation adapted to educate the customer about the goods and services; input means adapted to enable a type of customer enjoying computers to access the software in order to bypass the presentation, and, in a self-service mode, to browse in the software to view desired information to learn about goods and services at his desired level of knowledge; means enabling both types of customers at any time they desire personal assistance to utilize the means establishing voice contact to talk to a representative at the central computerized communications facility; application software located at the central computerized communications facility enabling either type of customer to download from the central facility to the customer computerized communications facility information desired by the customer; and input means located at the customer computerized communications facility enabling the customer to access application software located at the central computerized communications facility.

Further, the information regarding the goods and services obtained by the customer includes accompanying voice narration.

The input means at the customer computerized facility and the application software at the central computerized facility enable customers to search for goods according to model, manufacturer, and marketer of the goods.

The input means at the customer computerized facility and the application software at the central computerized facility enable customers to search for a predetermined selection of goods.

The application software at the central computerized facility enables the customer to download instruments finalizing a transaction relative to the goods and services.

The application software at the central computerized facility includes a subroutine for charging customers for their use of personal assistance.

The application software at the central computerized facility includes a subroutine for charging customers for each instance a customer is shown product information.

The application software at the central computerized facility includes a subroutine requiring customers to view a specified amount of product information in return for being granted a specified amount of use of the system.

The application software at the central computerized facility includes a subroutine providing the customer an electronic phone book containing a directory of providers and goods available.

The application software at the central computerized facility includes a subroutine which builds a general customer profile based upon customer's requests for information.

The application software at the central computerized facility includes a subroutine permitting a plurality of customers at different computerized locations to view simultaneously the same presentation and to speak to each other during said presentation, the presentation being under the control of one of the customers.

Means are provided for control of the system to alternate between the individuals so that at times a first customer can control the presentation while at another time a second or other customer can assume control.

The central facility is a service company representing the provider of the goods or services.

A representative is located at the central computerized facility and that representative is an agent for the provider of the goods and services.

The customer computerized communications facility includes means for communicating with a number of different central computerized communications facilities The system wherein one facility is a retail sales store, and the other facility is a banking institution.

The system wherein one facility is an automobile company and the other facility is a bank.

The improved system wherein the central facilities are auction houses.

The system also includes means enabling a customer to speak with a representative at each facility.

THE INVENTION

The prior art fails to recognize that some individuals love to use computers, while others are intimidated by them. This invention provides for both types of customers.

Another problem is they failed to recognize that the public they were dealing with is a generation accustomed to television. Traditional computer methods typically applied towards back office accounting functions by large computer organizations such as IBM, Univac, and Honeywell where users peered blurry eyed into cathode ray tubes are not compelling when applied toward commerce. Customers were not accustomed to having to read large amounts of text and would not accept that approach. This failure on their part greatly explains their poor results and why the public refused to accept their antiquated methods. To correct those earlier failures the present invention uses the computing devices to transmit presentations of goods and services including text, graphics, voice, audio, music, images, and video.

The use of computerized voice is significant. The prior art is limited generally to transmitting only text and perhaps a few graphics, requiring that the customer read a great amount of text to get the information they wanted. In contrast, the system of the present invention understands these preferences and has adjusted the system accordingly to accommodate the present generation.

A disadvantage of text is its limited ability to convey enthusiasm, emotion, and in general meaning. There is much contained in human speech in terms of inflection, tone, and volume which convey a significant part of the idea intended. Consider that a particular sentence can when spoken one way be a compliment, yet when spoken with different inflection it becomes an insult. As illustrated, text seldom conveys these colorful aspects of speech and can never succinctly convey a complex thought or idea entirely. Even worse results can be obtained when translating from one language to another. Text only approximates speech. It does not replace it as the forerunners of these systems assumed. For this reason this system's use of computerized voice provides surprising and superior results.

This invention provides a system where customers can shop for homes and obtain financing all in one place, computer stores, homes, factories, office buildings, and from all public and private locations from which a consumer or customers want to obtain product information or perform a transaction.

DETAILED DESCRIPTION OF THE INVENTION

In the case of auction houses a number of the remote locations can be concurrently linked with one or more central facilities or auction houses so that groups of customers at each remote or local auction facility can participate in the actual auction at one or more distant central facilities or houses. In this fashion auction customers throughout the world can participate at local auction houses in auctions taking place throughout the world so that a customer in Saint Louis can participate and bid in an auction concurrently taking place in Hong Kong or France. In this particular embodiment each customer can be provided his own personal input device permitting him to personally enter his bid during the joint auction session and at the conclusion of a successful bid remit his payment. He can as well be provided a separate monitor or can share a large screen with some or all other attendees. Each customer can be provided a separate recording or printing device to provide the customer a record or receipt of any transaction he performs.

A number of terminals can be grouped to form an electronic shopping store permitting the customer to obtain desired information on the products of his choice while having access to highly knowledgeable representatives and can also record, print or otherwise, selected information for their later review. For this purpose the customer's monitor can display a tool or icon they will use to control the information to be recorded. Remote facilities can even be portable so that for example they can be used at trade shows such as car shows permitting attendees to obtain more specific information about the products they desire and to execute their purchase and obtain financing. The customer is to communicate with central facilities or locations comprising banks, credit unions and finance companies, a service company representing such companies, manufacturer's offices, or in general any location from which a customer might wish assistance in facilitating a transaction. The method by which the transactions are facilitated reduces the costs associated with creating, marketing, administering, and selling these products and services, thereby making them more cost effective and affordable.

By providing that the central facility can be a service company the present invention has departed from the previous art. Typically when marketing their products in a traditional approach a company will use the assistance of a service company rather than directly sell or market their own products. The difficulty with the previous art is that they did not allow for a complement to the traditional marketing approach. In the case of deploying these systems specific corporate capabilities will be required. If companies have not felt comfortable in marketing their own products using long established methods and channels, they most certainly will not feel comfortable in using this system on their own. It is anticipated that many will instead demand the assistance of a third party who is more acquainted with the technologies involved and has developed expertise with them.

The foregoing objects are accomplished by a transaction system and method where having earlier established communication between the remote and central locations the customer can use the electronic communications devices and computing equipment at the remote location to contact a financial services company or some other central facility to facilitate a transaction, such as negotiate the purchase, lease, and contracting of financial services and/or other goods and services. In the preferred embodiment of the present invention a financial services company and its agents who will now be responsible for selling these products to the customers are located centrally and all or substantially all activities of the financial services companies or central facility and its agents are centralized in its state making those products subject at most to the laws of that state or sovereign and thereby drastically reduce or simplify regulatory constraints and streamline related compliance and business costs such as by having only one computer system used to support the selling and administrative process thus eliminating the need to provide this support including applications software at each distributed remote location and in having to train only a single centrally located group of individuals who will act as the agents or representatives.

Previously these financial services companies sold their products through agents located at the site of the customer. The difficulty is that many of the products required that the agents be licensed to sell certain products such as investments and insurance. The difficulty with this is that a significant amount of training and expense was required to place these agents out there. High turnover rate of employees at one location could pose a real problem. The process of getting an agent licensed can itself take a year and each state regulated the licensing of agents within their state. In centralizing the agents we are able to reduce the licensing requirements since agents at the central location can service customers from multiple states so that an agent at a central location say in Missouri could serve customers in theoretically all 50 states. So rather than have 50 different agents each serve a customer in each state we can have one agent serve all 50 customers thereby reducing licensing bottlenecks and related expenses. The reduction in those expenses can then help these firms better manage their business expenses and in turn pass these savings on to their customers.

Although in the preferred embodiment the customer speaks with only one representative at a time it is further anticipated that the customer can speak with multiple representatives from either the remote or central locations at the same time as in a team sales approach. As it is anticipated that customers will speak a variety of languages it will be necessary for presentations and representatives thus provided to be based in the language of the customer; whether it be English, Spanish, French, German, Japanese, or any other desired language. This approach might include utilization of personnel at the remote facility to collectively assist the customer. Also in the preferred embodiment the financial services company or central facility will have no physical presence at the remote facility meaning they can not advertise in any fashion such as on radio, television, or in magazines in the state of the remote facility or by placing or storing product information such as sales materials or literature at the remote facility itself. This will require storing all product information at the central facility so that all activities including product information about these goods and services are then centralized at the central facility.

It should be understood however that certain information can be stored at remote facilities such as directories of facilities for dialing purposes or a data base of providers of goods and services arranged by category of business or products offered such as in the Yellow Pages phone directory. In that sense an electronic phone book can be stored at the remote facility or instead upon pressing or utilizing the touch screen, keyboard or input device the customer can activate the system causing it to retrieve from a central facility a directory of goods and services available and thus permitting the customer to select another central facility from a displayed list or catalogue and establish contact with it and thus have access to numerous central facilities and a myriad of goods and services.

The present invention in utilizing an electronic version of a Yellow Pages has deviated from the prior art in modifying these types of systems to fit with existing shopping patterns of the public. Rather than requiring the public to change their method of shopping for goods and services as the prior art requires, the present invention has adapted to existing modes of shopping. The present invention has anticipated that the public's learned behavior is difficult to break and so has provided that the customer can shop according to existing patterns permitting them to shop by manufacturer, product, or marketer as one might if they were previously shopping for say a tire. In that event a customer can locate that specific tire either by its model name, its manufacturer, or the marketer through which he intends to purchase it. This approach is akin to a customer shopping through the White or Yellow Pages or by store or in a mall.

Additionally customers can just browse through a selection of goods and services as though they were window shopping. To accomplish this the system can present a collection of products for those customers who do not have any specific need but are rather shopping as entertainment. This might include a group of unique products offered at special prices or terms. These could include limited edition merchandise or closeouts. As demonstrated, rather than requiring the public to adapt itself to a new method as did the prior art, this system has adapted itself to the public and current shopping behaviors.

While in general all or substantially all application software will be located at each central facility, such as programs which will prompt the customer for input, choices, or preferences so that the customer will contact the central facility and then indicate his choices or preferences; it can also be beneficial to download certain software from the central facility to the remote location to provide proper control and support for the customer such as by means of appropriate communications software or operating systems. This provides for the simple updating of any needed communications or other remote located software at the remote facility and ensure that each remote location will be compliant with future standards of communication and protocol based upon changing needs and industry standards. Such downloaded software can be stored temporarily at the remote facility to be used only in the current session or can be retained for all or selected future sessions. It can also be beneficial to quickly download a catalogue of desired or requested information to permit the customer to review leisurely while terminating the communication link to reduce connect charges or free utilization of the central facility's resources. The customer can then reestablish contact with the previous or a new representative and central facility when he is ready. To facilitate such a technique the remote or central location can record the stopping point of the customer's last on-line presentation so that when contact is resumed an appropriate presentation continuing point can be ascertained.

An alternative is to allow the customer to enter any phone number he might wish to dial while accepting a credit card, debit card, or calling card where the customer is to pay or be charged for any phone, connection, or use charges that will be incurred. In this fashion the customer is to be charged for the use of the equipment or transmitting and receiving means. The customer could be charged for any system use or only for their use of an attendant at the central or remote locations should they need assistance. However, it can be necessary or beneficial to not charge new customers for use of live attendants for a select period of time. Thereafter they will be treated as other customers. Otherwise, charging new customers for their use of attendants can discourage them from attempting the system's use. Once we get them accustomed to the system it will be easier to convince them to help themselves.

Alternatively, the customer could be charged for any use, but more when they need human assistance. The benefit of this approach is that in offering live assistance customers are encouraged to use the system. This is sometimes necessary as not all customers will feel comfortable in using what they can perceive as a computer perhaps for fear of feeling or appearing inadequate. Having human assistance available will make these customers feel more secure and therefore willing to try the system. Yet in charging customers for the use of human assistance they are encouraged to help themselves thus permitting greater utilization of the representatives. This is perhaps an adaptation of animal or human behavior enticing the customer to first use the system and thereafter encourage them to help themselves.

As above, the system could thus provide a means to read credit cards and such as by card swipe reader or any other approximate equivalent means and can as well be used to later tender payment for goods and services purchased. In this sense the system could be used as a sort of public telephone to transmit and obtain information about any goods and/or services the customer might desire from any central location anywhere in the world.

A further variation in this theme is to instead charge the providers of goods for listing their products on the system. This could be in the form of a periodic flat fee or the providers could instead be charged for each incidence a customer requests their product information or is shown it involuntarily based on a customer's profile. Different rates can apply depending on whether a customer requests the information or is shown it involuntarily. To improve the reaction of the customer to an involuntary commercial the system might instead at the predetermined time offer a choice of commercials to the customer prompting them to choose which one they have most interest in and wish to see. One choice could even be a random selection if the customer wishes to be surprised.

This response serves two purposes. The first is that in voluntarily choosing which product the customer is to learn about, they are more apt to assume a positive attitude toward that product since they willingly chose it. Second, this selection by the customer could be used to build or update their customer profile.

In a similar fashion as the customer's profile can be used to determine which products they will view in commercials, this profile can also be used to determine which version of a provider's commercial a customer will see. It is a common practice in advertising to alter a commercial according to the demographics of the anticipated viewer. A commercial appearing on a country and western radio station will differ from that appearing on a classical music station. Having a profile for each user will permit advertisers to provide a message custom tailored to each specific customer profile.

To determine its corporate customer profile each provider of goods can use the system. Profiles of those customers who specifically request product information can be used by those providers to build general profiles of those customers who might have an interest or need in their goods. Thereafter those provider profiles can be used to help the system guide commercials to system users most likely to be interested in those goods. Commercials can then be shown to customers intermittently throughout the customer's session or at predetermined points such as when the customer is waiting for live assistance or in between queries.

One approach is to require that each customer watch a specified number of minutes of commercials for a given number of minutes of entertainment programming.

Another approach to commercials is to credit a customer's account for each minute of commercials or product information he views or according to the amount of goods they purchase. In return the customer could be granted so many minutes of entertainment programming. One approach to this is similar to a traditional broadcast strategy where the customer passively sits back and watches assorted programming. Yet at anytime the customer can use an input device to request information on sponsors' products. A list is then presented to the customer of the various sponsors and the customer could then choose which ones he wants to see a presentation on.

Alternatively, a list of sponsors and their products could be collected from each program watched so that after the program has completed the customer could then review the list of sponsors and choose which commercials they will view. The products and sponsors can be tied into the programming but need not be related. The system could also build a list of chosen sponsors for each customer allowing them to at a later date go back and review the same or additional information on those products. As above a customer is only permitted so many minutes of entertainment programming for each minute of commercials. The result is quite different from present day television as customers are required to actually participate in the selection of the commercials they are to watch and can immediately obtain more specific information on those products they choose. Having made the decision for themselves, it is expected that customers will have more interest in the products of sponsors.

BRIEF DESCRIPTION OF THE DRAWINGS

In the following detailed description, reference will be made to the attached drawing in which.

DETAILED DESCRIPTION OF THE INVENTION

Figure 1:
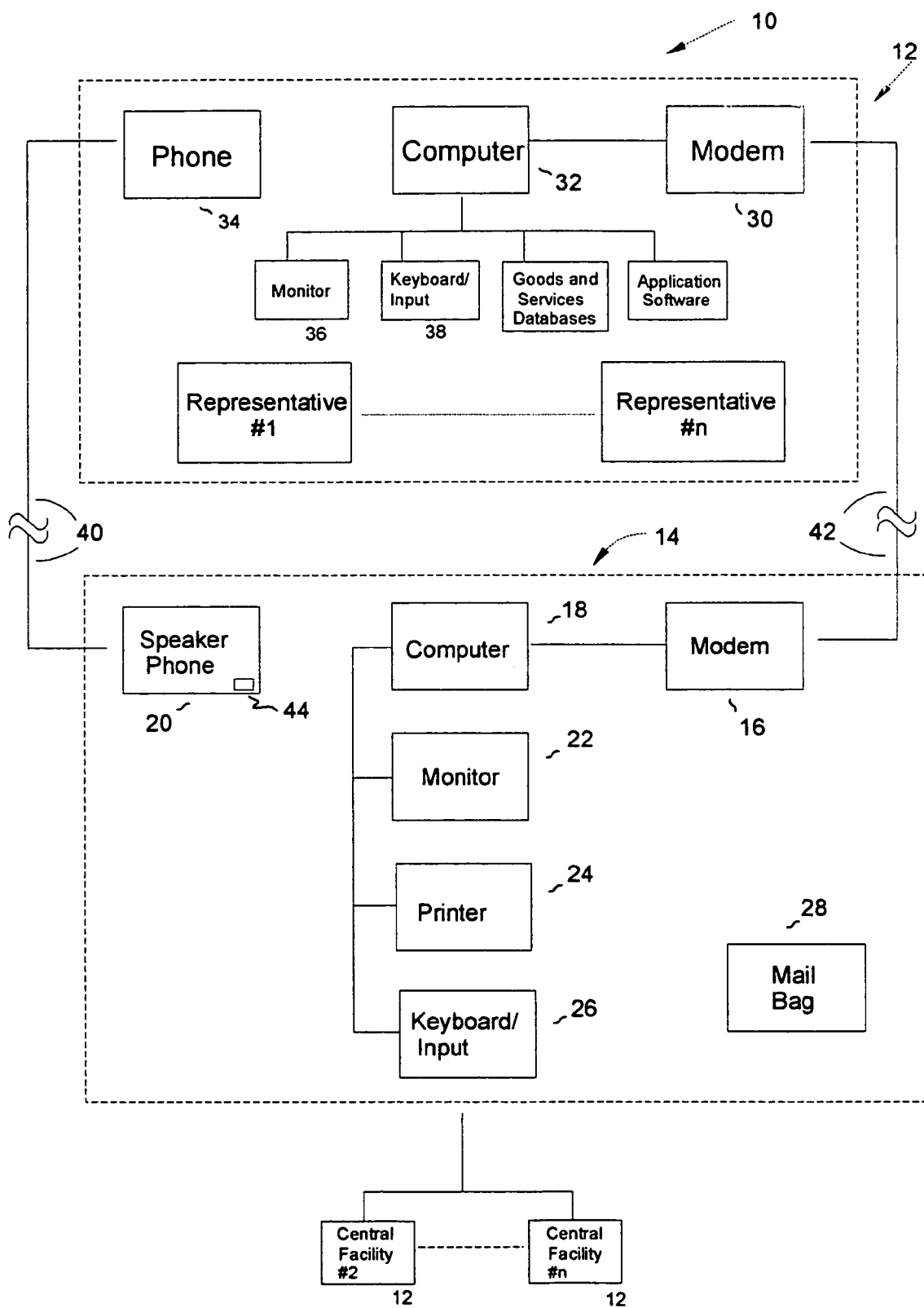
FIG. 1 is a block diagram of an array of electronics communications components employed in a system and method for facilitating transactions in accordance with the principles of the present invention.

The preferred embodiment of a system 10 and method for facilitating transactions in accordance with the principles of the present invention will now be described in detail. The transactions facilitating system 10 includes at least one central facility 12, such as a financial services company, marketer, or manufacturer and at least one remote facility 14, such as a retail sales facility, or any other public or private location from which a potential customer of the central facility 12 wants assistance in facilitating a transaction. For instance, the remote facility 14 can be retail sales facility, such as car, truck, boat and/or motorcycle dealerships. The central facility 12 can be a financial services facility, such as a bank, credit union or a finance company or any other central facility from which a customer wants assistance in facilitating a transaction.

In the illustrated case of financial services, the system 10 facilitates the carrying out of activities such as financial business transactions in accordance with the principles of the present invention by employing an array of means for transmitting and/or receiving information comprising visual, audio, and/or data between the financial services facility or location 12 and a customer at one of the respective remote facilities or locations 14. The financial services facility 12 offering the goods and/or services or assistance in facilitating such a transaction is established at a central location. Each retail sales or remote facility 14 is sited at a given remote location where potential customers are located whether stationary or portable. In this respect the system can be used to execute a transaction between the customer and the central facility or it can only provide assistance to the customer in his selection of goods and services which a local or remote facility are to thereafter provide.

At the remote retail sales facility 14 an area is established where an array of electronic communications equipment is provided in accordance with the present invention for transmitting and/or receiving information comprising visual, audio, and data about financial services or other goods and services between the central financial services facility 12 and the customer at the remote facility 14.

More particularly, as seen in FIG. 1, an exemplary remote facility 14 has an array of electronic communications devices and computing equipment which includes a modem 16, a digital computer 18 or other means for processing information, instructions or data, a speaker phone 20 or other means for exchange of audio transmission, a monitor 22 or other means of conveying images, a printer 24 or other means for recording signals or information conveyed from the company 12, and a keyboard or input device 26. It is anticipated that a handset rather than a speaker phone or external speaker can be used in instances where a customer wishes to speak privately with a representative.

For an application of this system in homes the input device could be a television remote control device perhaps with alterations comprising cursor movement keys, a joystick, or a microphone for voice input. In recording this product information the customer can then save or take the desired information with him for his later review which might comprise instructions for use, operation, or assembly and can include a list of suggested products or services as advised by the live representative or by the central facility computer. Such information might be recorded on paper, magnetically such as upon a cassette, video tape, computer disc, CD, or a chip embedded or smart card, or by some other means. Comparably the central facility can record the transaction for later retrieval so the customer can continue where he left off at a later date should his interest renew or for identification purposes or for possible assistance in resolving disputes. Other means to verify identification of the customer can be used comprising magnetically encoded badges or cards, or the use of eye or finger scanning devices. Additionally, a mail bag 28 or other means for remitting payment or documents is provided at the remote facility 14.

FIG. 1 further shows an exemplary central communications facility 12 including computer 32 having monitor 36, keyboard/input means 38 as well as Goods and Services Databases and Application Software. As discussed in greater detail herein, a Goods and Services Database includes information of competing goods and services and/or providers of goods and services which may be of interest to the customer at the remote facility. The exemplary central communications facility 12 of FIG. 1 is further shown to have a modem 30 and a phone 34 or other means for exchange of audio transmission. For communicating with the customer at the remote retail sales facility 14, a complementary array of electronic communications devices and computing equipment is located at the financial services facility 12 or central location. As seen in FIG. 1, this equipment includes a modem 30, a digital computer 32 or other means for processing information, instructions or data, a phone 34 or other means for voice exchange or audio transmission, a monitor 36 and a keyboard or other input device. Only a complementary printer is not needed at the financial services facility 12 for the purpose of facilitating transactions in accordance with the present invention. Preferably, two separate phone lines 40, 42 are available to interconnect the respective phones 20, 34 of the facilities 14, 12 simultaneously with, but separately from, the interconnection of the respective modems 16, 30 of the facilities 14, 12 so that voice or audio, visual, and data communication can be ongoing concurrently between the customer at the remote facility 14 and an agent at the financial services facility 12. Alternatively such contact can be established by coaxial cable such as through a cable company or some other means of establishing contact or by means of some wireless technology such as radio. Each of these components of the respective electronics communications equipment at the respective facilities 12, 14 is per se a conventional off-the-shelf item and thus it is not necessary to describe such components in any further detail.

One embodiment could use a combination of wired and wireless technologies. In this instance the information being transmitted to the customer could be on a wireless basis whereas the signals transmitted to the central facility could be on a wired basis. The advantage of this approach is that standard telephone lines can be insufficient at transmitting extensive amounts of video and audio information. However, the bulk of this type of transmitting will in certain cases be going from the central facility to the customer. But in many instances the demand for transmitting from the customer to the central will be significantly less and will in most cases be adequately handled by normal telephone lines. This approach can then reduce the expense of deploying these systems by reducing or eliminating the need to install a more advanced wired communications network.

Referring again to FIG. 1, it should be noted that the central communications facility 12 shown in the enlarged view is an exemplary embodiment of a central communications facility. Additional central communications facilities 12(#2) through 12(#n) are illustrated in FIG. 1. Each of central facility 12(#2) through 12(#n) can include substantially the same features as shown in the enlarged view for central communications facility 12, including the functionality for communicating audio, visual and data communications over telephone lines or, alternatively, by cable or wireless technology. FIG. 1 also illustrates that central communications facilities 12(#2) through 12(#n) are linked to each other and to remote facility 14, using the communications functionality described above. Such links may be established through telephone or other communications networks.

At the remote facility 14, the customer of the retail sales facility 14 and/or of the financial services facility 12, is escorted to the area where the above-described array of electronics communications equipment of the retail sales facility 14 is provided. The customer presses an auto dial button 44 on the speaker phone 20 or uses his input device such as a touch screen to select a central facility to contact from a list displayed on his monitor and in doing so establishes contact with the financial services company 12 and perhaps its agent by way of some means of transmitting data, audio, and/or visual information comprising telephone or videophone thus permitting the simultaneous or concurrent transmitting of audio, video, and data as the customer and representative speak with one another or establish voice contact and while the representative provides the customer with information about goods and/or services. At that time the customer can automatically review established presentations to better prepare him for a session with a representative and to educate the customer on the goods and services he is about to consider or at the customer's wish he can bypass these introductory presentations and immediately direct the session or request personal assistance from a representative.

As an alternative the customer can establish contact with the central facility's equipment without the assistance of a representative and merely help himself in a self-service mode where he can browse through databases of goods and services. The speaker phone 20 as contemplated herein is intended to encompass other comparable devices, such as a videophone or the like, where in addition to 2-way verbal contact the customer can establish 2-way or 1-way visual contact with the agent. Concurrently or subsequently the remote terminal can transmit its phone number, serial number, or identification code to the central facility so as to identify itself and thus satisfy any future administrative needs of the central facility should for example a break in communications occur and the need arise to reestablish contact with the specific remote facility and its customer. In this respect it will be necessary for each remote location to store this serial, phone, or station identification number for future transmittal.

While in the preferred embodiment the customer at the remote facility initiates contact with the central facility it is contemplated that the central facility or its representative can have occasion to initiate contact with a given remote facility. An example is a public or private location where the central system contacts the remote facility to apprise potential customers of goods and services offered. In a public location such as at a mall a remote terminal can perform for customers who pass and prompt them to press the screen to obtain specific information.

To facilitate reconnection should an accidental break occur in the connection between remote and central facilities, upon each break initiated by a customer a control signal will be transmitted to the central location. Otherwise should any break occur without the central location having just prior received this code the central facility will know to reestablish contact. If the code is received just before the break there will be no need to reconnect as the customer terminated contact. Another approach is to store the presentation stopping point at the customer location so that if accidental break occurs the remote system can reinitiate contact if the customer wishes.

Having established contact the customer and agent then speak with one another by way of the phones 20, 34 of the respective facilities 14, 12. Concurrently, the agent by using his or her digital computer 32, monitor 36, keyboard 38 or other input device and modem 30 establishes electronic contact with the customer's modem 16, digital computer 18, monitor 22 and printer 24 if such contact has not already been established by the customer by means of a single telephone or communications line, or wireless means to transmit and provide helpful audio, video, and data information to the customer about the transaction being proposed for the customer by the financial services facility 12. Such information can take the form of charts and the like displayed on the monitor 22 or printed on a sheet of paper by the printer 24. It can comprise audio and visual information related to those goods and services of interest to the customer and can contain any desired sales or product information such as product specifications, service data, published articles, product demonstrations, orchestrated presentations, sales literature such as you might find in a brochure or catalogue, possible uses, compatibility, styles, selection, availability, comparisons to other products or services, published articles on products or services; product features, compatibility, or requirements.

In the case of financial instruments or investments, information might comprise expected profit or margins, past performance of like products, maturity dates, terms, conditions, exclusions, limitations, and exceptions. In the case of automobiles or other durable goods information might comprise models, styles, expected life, efficiencies, colors, capacities, maintenance requirements, options, comparisons between models, published articles on products or excerpts of, pictures of products (still and full motion of product as in its various uses), testimonials of products, commercials, or infomercials. Information for home users when purchasing or renting movies, music, or other forms of entertainment might comprise: ratings, titles, product descriptions, artists or actors, articles written by critics or excerpts of, short segments of music or movie (samples or previews), lists of products available and in general any audio or visual information a customer might wish to know including quote, price, or any information about goods or services other than quote, binder, or price.

As an assistance to any attendant or representative at the central facility that same or related product information can be displayed on the representative's monitor at the central facility to aid in his assisting the customer.

The digital computer 18 stores suitable well-known off-the-shelf operations, communications and perhaps graphics software programs in its memory and is operational to translate the signals, electronic or otherwise, caused to be transmitted from the financial services facility 12 into such displayed, audio reproduced, recorded, or printed information. An example of a suitable communications program is one commercially available under the trademark Carbon Copy thus permitting or enabling the representative to control the equipment at the remote facility and permitting the customer to retrieve and access information about goods and services stored at the central facility. An example of a suitable graphics program is one commercially available under the trademark Harvard Graphics which can be used to reconstruct digitally transmitted information back into visual images.

Thus, the agent residing at the central financial services company 12 has the ability to control the above-described electronic communications equipment in the presence of the customer located at the remote facility 14. The agent is thereby able for example to display any desired information at will on the customer's monitor 22 or to print any information at will on the customer's printer 24. The customer can respond verbally to central facility prompts initiated by the representative or the central facility equipment via the speaker phone 20 or by using his or her keyboard 26 or other input device or some other means to convey customer supplied information. Such an input device is anticipated to comprise a touch screen permitting the customer to press a screen displayed icon to supply his choices or input, and voice activated response or voice recognition input permitting him to speak his responses, selections, or data input. Personal data to be supplied by the customer can be voice input or supplied by other appropriate means comprising retrieved from a personal data card supplied by the customer by means of a magnetic reader or other comparable device capable of retrieving information thus stored and the system can then permit the customer to update or correct any information provided. The system can also utilize voice synthesis to prompt or present options to the customer and can be used in tandem with visual prompts.

In this fashion the customer can at his leisure and without the assistance of the representative review any desired information about those goods and services he is most interested in with complete privacy yet can by way of his input device request a representative at his will should he desire personal service. He or she can then serve himself should he wish or if preferred he can sit back and let the representative fully control the presentation. The transmitted presentation can utilize a well known spokesperson and give the appearance of a commercial or infomercial. On his own the customer can back up, fast forward, skip, or jump to the specific product information he wishes at his command. His access to this information is described in the computer industry as random. Information can be provided at various levels of detail through a technique known as hypertext. The customer can thus review a summary of specific information and at his request or command receive a level of information of greater detail. One such method of accomplishing the summoning of the representative is to provide an icon or tool on the customer's monitor which he can press or select at any time which in turn causes the system to summon or ring a centrally or alternatively remotely located representative to personally assist the customer.

Additionally a security feature could be installed to protect customers or the remote system from vandalism. Here the user is required to present his credit card or other ID to obtain entry into a locked facility containing the terminal.

Another approach to guard against vandalism is to have a live attendant greet on screen each customer as they approach the system. Alternatively, a camera could be placed on each system to monitor the customer's use and a notice could be posted about the use of the camera to protect the customer's availability to the system. An alarm can also be used that is activated automatically under certain conditions or manually by the rep at the central facility.

In providing the customer an input means we have permitted greater utilization of the representative's time and allowed the customer to only be assisted as he wishes. However it is beneficial to monitor the customer's activity to signal when an appropriate time might be for the representative to voluntarily offer assistance should the customer become confused or lost. An application of a computer technique referred to as artificial intelligence will help identify the occurrence. Such a situation is indicated by a customer's repeated review of the same information or lack of command to the system within a given period of time.

When appropriate the agent can then command the customer's printer 24 to create or print needed contracts and documents (comprising loan application papers, a notice of proposed insurance, an insurance binder, an insurance application, receipts, etc.). The agent can also display his or her own image in a corner of the customer's monitor 22 as a courtesy by using an appropriate communications program and a graphics file produced from the agent's photograph with a conventional image scanner.

In combination with the application for a loan or the presentment of a credit card or some other payment instrument the central facility perhaps under the direction of the representative or under control of the central facility's application software can initiate a credit check to determine the customer's credit worthiness or qualify the customer so as to approve the intended purchase. The central facility can itself store credit or check approval information for each prospective customer or can communicate with a third party such as TRW and exchange appropriate and necessary information on the customer while the customer waits at the remote facility to obtain the necessary credit history in order to process and approve the customer's request. Should the result of the check be negative, the representative can converse with the customer to perhaps arrange for alternate means of payment. Having qualified the customer the central facility can in the event of a loan request conduct the necessary risk evaluation, manually or electronically by means of algorithms to determine loan approval. A similar approach can be taken for insurance requests. The customer can respond to questions regarding his medical history and based upon a search of medical history either at the central facility or at a third party such as the Medical Information Bureau determine the insurability of the customer and insurance approval.

While in the preferred embodiment the final approval for loan or insurance is made upon the customer remitting completed forms either electronically or by mail or some other means it should be understood that having performed the necessary medical or credit check the central facility can immediately approve the customer's application or request for insurance or credit and commit itself. During the solicitation process the central facility can record and store the presentation for beneficial purposes such as to meet regulatory requirements for proof of disclosure as when selling insurance, loans, or investment instruments comprising stocks, bonds, annuities, and mutual funds.

Once the contracts are printed out the customer is directed to sign them and personally place them and any required payment (check) in a mail bag 28 located at the retail sales facility 14. A binder can be issued upon the customer signing applications for financial services and mailing them so he can take possession of any purchased goods or merchandise in contemplation of the financial services companies accepting the applications and performing final execution of the contracts in the home sovereign.

In the application of entertainment the possession can include the presentment of recorded performances or programming to the customer such as can be transmitted or in some otherwise fashion conveyed to the customer.

Alternatively, some other means of remitting payment and any completed contracts to the agent can be used such as electronically where the customer can for example endorse an electronic signature box displayed on his monitor by means of an electronic pen or other comparable device and subsequently transmit by modem the electronic contracts back to the central facility or by some other electronic means to permit the customer to legally apply for contracts perhaps comprising the faxing or transmitting of a signed contract from the remote to the central facility.

At the end of a session the system can prompt the customer for comments or take a poll. The customer can respond with his input device. The system can also encourage the customer to speak into a microphone to record the customer's comments on products, assistance provided by a live rep, or the system itself. The advantage in recording the customer's verbal response is that the easier it is for customers to respond the more likely they will. Also, open-ended questions that can be very revealing are difficult to obtain if the customer is required to hand write or type comments. Recording the response will make the best use of the customer's time and improve the success of obtaining this information. As a mechanism for requesting this information the system could list an OFF button. Once a customer has selected OFF the system can begin to execute a closing procedure which could include a customer questionnaire.

At some point during the customer's session the system can prompt them for their address so as to forward additional or updated product information to them perhaps regarding future special offers. This approach introduces a whole new method to sales promotions.

In one embodiment, once a customer has selected and paid for their purchase those products that can not be delivered on the spot (such as via a remote printer or other device permitting the culmination of a transaction) can be delivered to the customer such as at their residence or place of business. Alternatively, customers can pick up their purchases at a central order processing center.

Another embodiment provides for team shopping permitting a group customers at the same or different locations to view the same presentation simultaneously under the control of one of the customers as they speak with each other. In this instance a customer at the same or different remote location will assume control of the input device for one or more different customers. Control of the system can alternate between the individuals so that at times a first customer can control the presentation while at another time a second or other customer can assume control. The selected information will be presented to each shopper in the party though they can be at different customer locations. In this way each person in the group can share with the others products they find interesting. At the same time they car all engage in a group conversation or perhaps video conference so each can hear the other as they review the presentations together.

The advantage of this approach is that historically electronic systems have failed to captivate certain segments of the population such as females. Part of the problem is that the act of using such a system has to this point been a solitary activity. While some customers can be content using the system by themselves, others are more group oriented and prefer social contact. For example, while some people (perhaps men) will be more inclined to visit a store or go shopping by themselves, others (perhaps women) are more likely to be accompanied by a friend. This embodiment of the system then recognizes these differences between customers and allows those who are more group oriented to use the system in a way they are comfortable with.

Another use of the system is to create electronic cities. Here the system creates a tour to guide electronic tourists through a selected city showing important points of interest as presented by an electronic version of a tour guide with verbal narration. Customers are allowed to browse and shop on their own at anytime. Using the system in this way customers are able to electronically sightsee and shop at a selection of cities within their country and internationally. The ability to tie in the flavor and charm of a city or country with its products should greatly encourage customers to shop and make the customer's experience fascinating. Cities and countries could introduce themselves in a positive way and encourage tourism. The system's use in this fashion allows it to disseminate knowledge of a region and its people to others helping to improve relations between cities and countries.

Another version of the invention utilizes a full blown video conference center providing a large screen, perhaps wall sized, 2 way color video and audio device in addition to a remote printer used to generate or print documents for the prospective customer. In this fashion the customer is placed in a theater like environment so he can comfortably view any desired product information by means of full motion, full color, audio/visual presentations. Images can be displayed by holograms or similar 3 dimensional means to give life and form to goods or services sold.

Alternatively the video can be 1 way or nonreciprocal versus 2 way or reciprocal should the customer prefer to not be on camera. It can as well be monochrome as opposed to color where preferable such as when communication resources are not available to achieve full color video. To put the customer at ease at the start of each session the customer's monitor can display his own image permitting him to make any grooming adjustments he wishes and in doing so better put his mind at rest.

In addition to accepting a credit card or similar means as payment for system use, the system could accept cash or any other payment means.

Although the system 10 has been described with reference to financial services, the concept of the present invention is not so limited. It can be used to sell or assist in selling all goods and services comprising cars, boats, motorcycles, vacations, travel packages, investments, furniture, real estate, service contracts, product warranties, entertainment, financial services, and all other goods or services a customer might desire to remote customers whether or not financed or insured such as at a consumer goods store where customers use the system to select and transact their purchase.

In this sense the system serves as an expert system allowing the customer to obtain knowledgeable assistance from a central facility and its salesperson or representative. This is especially beneficial for customers of retail stores which sell large ticket items or complicated products which require or benefit from highly or moderately skilled sales people. This responds to a common complaint that few stores have knowledgeable staff. The customer can then select and pay for his purchase at the terminal and take possession of his goods upon leaving. In using the equipment in this fashion the provider of the equipment can charge the customer a fee for use of the system and its services for which it can then provide the customer with a printed coupon, rebate or voucher for free goods or services, or an equivalent or partial discount should the customer purchase his goods or services at that remote location during an unlimited or limited future period of time.

Such a system is be of great benefit to an employment agency or head hunter who might then record interviews with a selection of employee candidates for presentation purposes permitting prospective employers to browse the catalogue of candidates in quickly narrowing and finalizing their recruiting search.

It can now be readily seen that the system 10 of the present invention accomplishes its first object identified above by centralizing the administration and selling of products and thereby substantially reduces the costs associated with creating, marketing, and administering these products and services. The system 10 also accomplishes its second object identified above by consolidating all management activities of the financial services products with the central office. The primary or only task of the retail sales location in the preferred embodiment is to refer the customer to the equipment at the remote location. Hence, all possible responsibilities are centralized permitting better control and simplifying ongoing management. With the great reduction in costs associated with developing and administering new products it is now possible, that is affordable, to develop a greater variety of products which are then more likely to fit the needs of specific customers. The third object is achieved as new product supporting materials, such as computer programs and other sales materials, are now centralized and it is no longer necessary to train an army of outside staff to sell and support the new products, giving the financial services company or other provider of goods and services more control as well on the sales process.

The foregoing description of the preferred embodiment of the invention has been presented for the purposes of illustration and description. It is not intended to be exhaustive or to limit the invention to the precise form disclosed. Many modifications and variations are possible in light of the above teaching. Such modifications and variations are deemed to be within the scope of this invention.

What is claimed is:

1. An apparatus for marketing goods and/or services, comprising:

a computerized central communications facility of a first provider providing information relating to goods and/or services to a customer at a computerized remote facility, said computerized central communications facility configured to provide information permitting the customer to select and contact at least one other computerized central communications facility of a second provider to request and access additional information relating to said goods and/or services;

a communication device at said computerized central communications facility of a first provider, said computerized central communications facility communicating with the computerized remote facility, said communication including transmitting said information to the computerized remote facility; and a database of information relating to said goods and/or services accessible to the customer at said computerized remote facility;

wherein said computerized central communications facility is adapted to record a search stopping point for future reference.

2. An apparatus for marketing goods and/or services, comprising:

a computerized central communications facility of a second provider providing information relating to goods and/or services to a customer at a computerized remote facility upon request, said computerized central communications facility of a second provider selected and contacted by the customer using information provided by another computerized central communications facility of a first provider having provided information relating to said goods and/or services;

a communication device at said computerized central communications facility, said computerized central communications facility communicating with said computerized remote facility, said communication including transmitting said information to said computerized remote facility; and a database of information relating to said goods and/or services accessible to said customer at said computerized remote facility;

wherein said customer can access, search or browse said database, and wherein the apparatus compiles each customer's profile based on the customer's search.

3. An apparatus for marketing goods and/or services, comprising:

a computerized central communications facility providing information relating to goods and/or services to customers at a plurality of computerized remote facilities, each of said plurality of computerized remote facilities remote from and linked to said computerized central communications facility; and a database of information relating to said goods and/or services accessible to customers at said plurality of computerized remote facilities;

wherein said computerized central communications facility provides auctioning services including receipt of auction bids placed by customers from said plurality of computerized remote facilities.

4. An apparatus for marketing goods and/or services, comprising:

a computerized central communications facility of a first provider providing information relating to goods and/or services to a customer at a computerized remote facility, said computerized central communications facility configured to provide information permitting the customer to select and contact at least one other computerized central communications facility of a second provider to request and access additional information relating to said goods and/or services;

a communication device at said computerized central communications facility of a first provider, said computerized central communications facility communicating with the computerized remote facility, said communication including transmitting said information to the computerized remote facility; and a database of information relating to said goods and/or services accessible to the customer at said computerized remote facility;

wherein at least one of said first provider or said second provider is charged a fee to provide said information relating to goods and/or services to said customer.

5. An apparatus for marketing goods and/or services, comprising:

a computerized central communications facility of a second provider providing information relating to goods and/or services to a customer at a computerized remote facility upon request, said computerized central communications facility of a second provider selected and contacted by the customer using information provided by another computerized central communications facility of a first provider having provided information relating to said goods and/or services;

a communication device at said computerized central communications facility, said computerized central communications facility communicating with said computerized remote facility, said communication including transmitting said information to said computerized remote facility; and a database of information relating to said goods and/or services accessible to said customer at said computerized remote facility;

wherein at least one of said first provider or said second provider is charged a fee to provide said information relating to goods and/or services to said customer.

* * * * *

US007379900C1

(12) EX PARTE REEXAMINATION CERTIFICATE (9650th)
United States Patent
Wren

(10) Number: US 7,379,900 C1
(45) Certificate Issued: May 14, 2013

(54) SYSTEM FOR MARKETING GOODS AND SERVICES UTILIZING COMPUTERIZED CENTRAL AND REMOTE FACILITIES

(75) Inventor: Stephen Corey Wren, Hazelwood, MO (US)

(73) Assignee: Scottrade, Des Peres, MO (US)

Reexamination Request:
No. 90/010,701, Nov. 5, 2009

Reexamination Certificate for:
Patent No.: 7,379,900
Issued: May 27, 2008
Appl. No.: 09/504,374
Filed: Feb. 15, 2000

Related U.S. Application Data

(60) Division of application No. 08/668,561, filed on Jun. 21, 1996, now Pat. No. 6,055,514, which is a continuation-in-part of application No. 08/268,309, filed on Jun. 29, 1994, now abandoned, which is a continuation-in-part of application No. 08/264,184, filed on Jun. 22, 1994, now abandoned, which is a continuation of application No. 08/051,743, filed on Apr. 22, 1993, now abandoned, and a continuation-in-part of application No. 07/855,099, filed on Mar. 20, 1992, now abandoned.

(51) Int. Cl.
*G06Q 30/00* (2006.01)

(52) U.S. Cl.
USPC ............ 705/26.3; 705/26.61; 705/37

(58) Field of Classification Search
None
See application file for complete search history.

(56) References Cited

To view the complete listing of prior art documents cited during the proceeding for Reexamination Control Number 90/010,701, please refer to the USPTO's public Patent Application Information Retrieval (PAIR) system under the Display References tab.

*Primary Examiner* — Eric B Kiss

(57) ABSTRACT

A system for shopping for goods and services includes central communications facilities and remote communications facilities connected by communications links and means permitting data communications between them. Central communications facilities offer goods and services in competition with each other. Each central communications facility stores, in addition to data, graphics in the form of video, and audio in the form of computerized voice and music. Computer input devices at each remote communications facility permit customers to access the data, graphics and audio. Computers at each remote communications facility also enable that facility to receive and download the data, graphics, and audio. Each remote communications facility is adapted to enable a customer, after viewing the data, graphics, and audio, to electronically negotiate a price for the purchase of the goods and services. Each central communications facility can generate and transmit to the remote facility transaction specific paperwork relative to the price so negotiated.

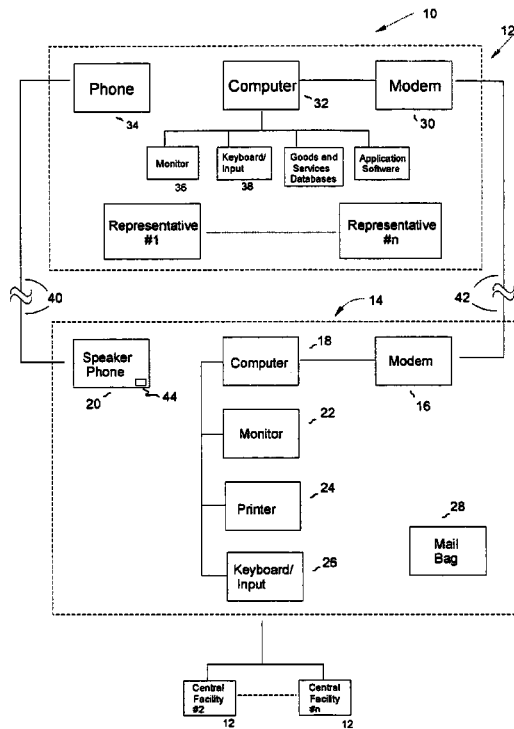

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-5 are cancelled.

\* \* \* \* \*